United States Patent [19]

Itoh et al.

[11] Patent Number: 5,702,546
[45] Date of Patent: Dec. 30, 1997

[54] PNEUMATIC TIRES HAVING A TREAD OF AN ORIENTED RUBBER

[75] Inventors: Kenji Itoh; Toru Sato, both of Kodaira, Japan

[73] Assignee: Bridgestone Corporation, Tokyo, Japan

[21] Appl. No.: 555,326

[22] Filed: Nov. 8, 1995

[30] Foreign Application Priority Data

Nov. 8, 1994 [JP] Japan .................................. 6-273227
Dec. 26, 1994 [JP] Japan .................................. 6-322933

[51] Int. Cl.⁶ ........................................................ B60C 11/01
[52] U.S. Cl. ........................ 152/209 R; 152/458; 264/108
[58] Field of Search ........................ 152/209 R, 209 D, 152/458; 264/108

[56] References Cited

U.S. PATENT DOCUMENTS

| | | | |
|---|---|---|---|
| 3,057,389 | 10/1962 | Dubetz et al. | 152/458 |
| 3,364,965 | 1/1968 | Oubridge | 152/209 R |
| 3,907,019 | 9/1975 | Montagne | 152/209 R |
| 3,916,968 | 11/1975 | Masson | 152/532 |
| 3,945,420 | 3/1976 | Gorter et al. | 152/458 |
| 4,385,653 | 5/1983 | Okazaki et al. | 152/209 R |
| 4,683,928 | 8/1987 | Yahagi | 152/209 R |
| 5,526,859 | 6/1996 | Saito et al. | 152/209 R |

FOREIGN PATENT DOCUMENTS

| | | | |
|---|---|---|---|
| 2049784 | 3/1992 | Canada | 152/209 R |
| 0 106 838 | 4/1984 | European Pat. Off. | |
| 0 468 306 A2 | 1/1992 | European Pat. Off. | |
| 0 592 218 A1 | 4/1994 | European Pat. Off. | |
| 2 215 331 | 8/1974 | France | |
| 1480962 | 6/1969 | Germany | 152/209 R |
| 146404 | 11/1981 | Japan | 152/209 R |
| 144109 | 9/1982 | Japan | 152/209 R |
| 2 236 504 | 4/1991 | United Kingdom | |

*Primary Examiner*—Steven D. Maki
*Attorney, Agent, or Firm*—Sughrue, Mion, Zinn, Macpeak & Seas, PLLC

[57] ABSTRACT

A pneumatic tire comprises a tread made from an oriented rubber so that a modulus ratio of 300% tensile modulus in a circumferential direction of the tire to 300% tensile modulus in a widthwise direction of the tire is larger by at least 0.1 times in a central region of the tread than in each side region of the tread.

7 Claims, 3 Drawing Sheets

FIG_1
PRIOR ART
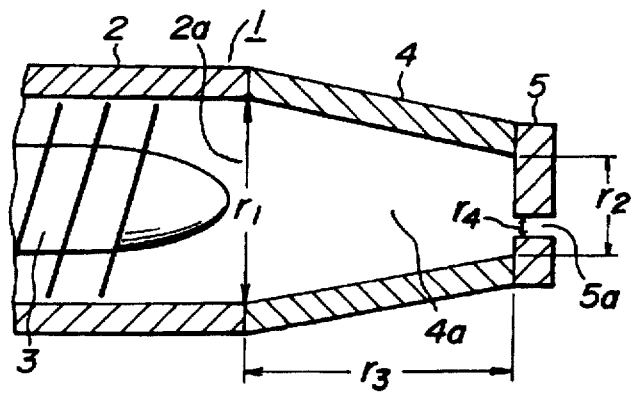
FIG_2
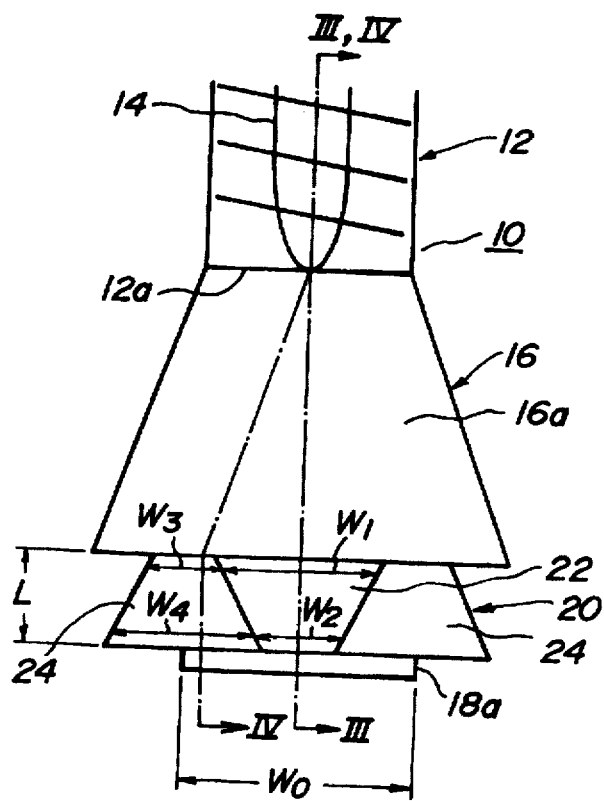

FIG_3
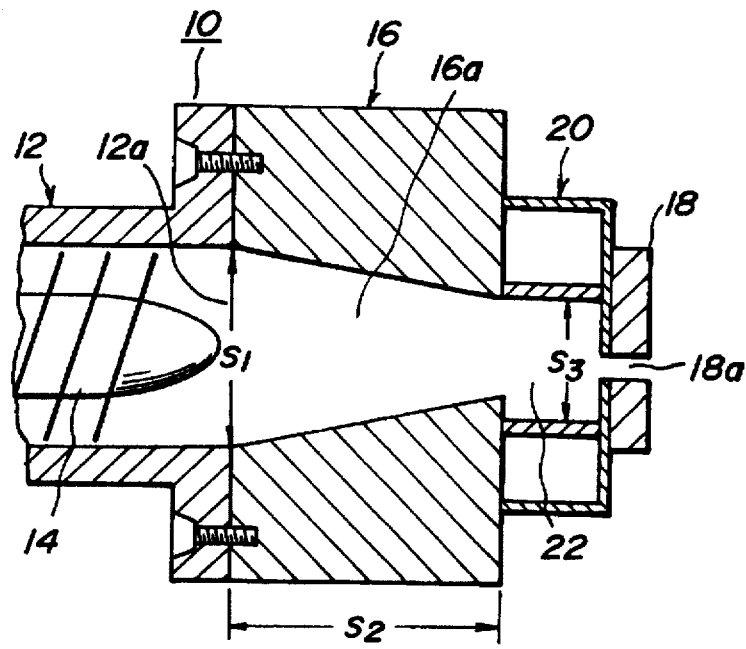
FIG_4
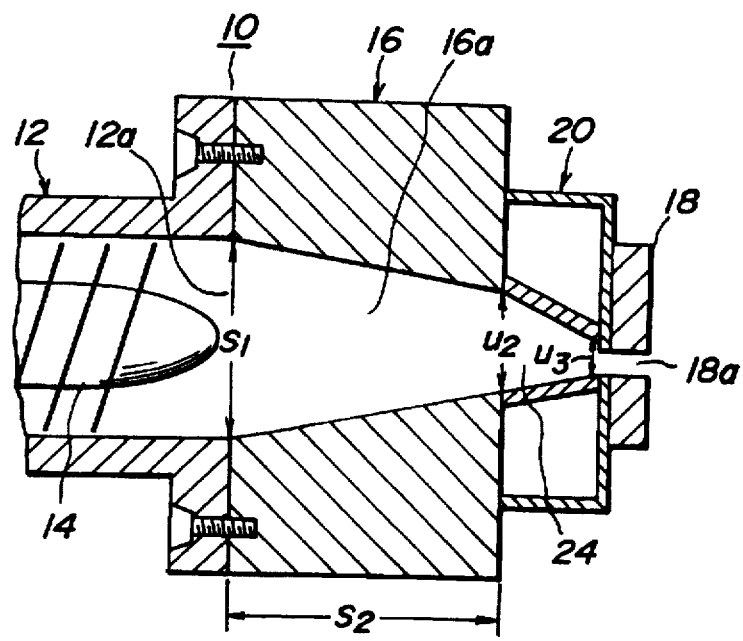

PNEUMATIC TIRES HAVING A TREAD OF AN ORIENTED RUBBER

BACKGROUND OF THE INVENTION

1. Field of the Invention

This invention relates to pneumatic tires, and more particularly to a pneumatic tire having a tread made from an oriented rubber.

2. Description of the Related Art

In general, it is required to soften a tread rubber to increase its energy loss in order to enhance the running performance of a tire, particularly a gripping force in the cornering of the tire. However it is required to harden the tread rubber to decrease its energy loss in order to enhance tire durability, particularly wear resistance and high-speed durability. That is, the running performances and the durability in the tire are conflicting requirements for designers in the compounding of the tread rubber. It is very difficult to simultaneously enhance both conflicting requirements only by the compounding technique of the tread rubber.

For this end, there has hitherto been proposed so-called widthwise divided tread wherein the tread is divided in the widthwise direction into three regions and a soft tread rubber is used in both side regions of the tread to enhance the running performances of the tire, particularly the gripping force in cornering and a hard tread rubber is used in a central region of the tread to enhance the tire durability, particularly the wear resistance and high-speed durability.

In the tire having the widthwise divided tread, however, tire productivity is poor and also the change of rubber properties at the dividing border becomes large to raise a problem of causing uneven wear, separation and the like at the dividing position.

SUMMARY OF THE INVENTION

It is, therefore, an object of the invention to solve the aforementioned problems of the conventional tire and to provide a pneumatic tire highly establishing running performances and the durability of the tire.

According to the invention, there is the provision of a pneumatic tire comprising a tread, the improvement wherein the tread is made from an oriented rubber so that a ratio of 300% tensile modulus in a circumferential direction of the tire to 300% tensile modulus in a widthwise direction of the tire (hereinafter referred to as modulus ratio) is larger by at least 0.1 times in a central region of the tread than in each side region of the tread.

In a preferable embodiment of the invention, the modulus ratio is 1.1–1.5 in the central region of the tread and 0.9–1.2 in the side region of the tread.

The term "central region and side region of tread" used herein means that the central region of the tread is located at a zone centering around a tread center and corresponding to 0.3–0.7 times a width of the tread (TW) and the side region thereof is located from each end of the central region toward each side end of the tread. Preferably, the central region of the tread is 0.5×TW in case of motorcycle tire and 0.6×TW in case of passenger car tire.

BRIEF DESCRIPTION OF THE DRAWINGS

The invention will be described with reference to the accompanying drawings, wherein:

FIG. 1 is a diagrammatically section view of a main part of the conventional extruder used for the formation of rubber sheets;

FIG. 2 is a schematically plane view of a main part of an extruder used in the invention illustrating a flow state of a rubber composition for the formation of rubber sheets;

FIG. 3 is a diagrammatically section view taken along a line III—III of FIG. 2;

FIG. 4 is a diagrammatically section view taken along a line IV—IV of FIG. 2;

DESCRIPTION OF THE PREFERRED EMBODIMENTS

Figure 5:
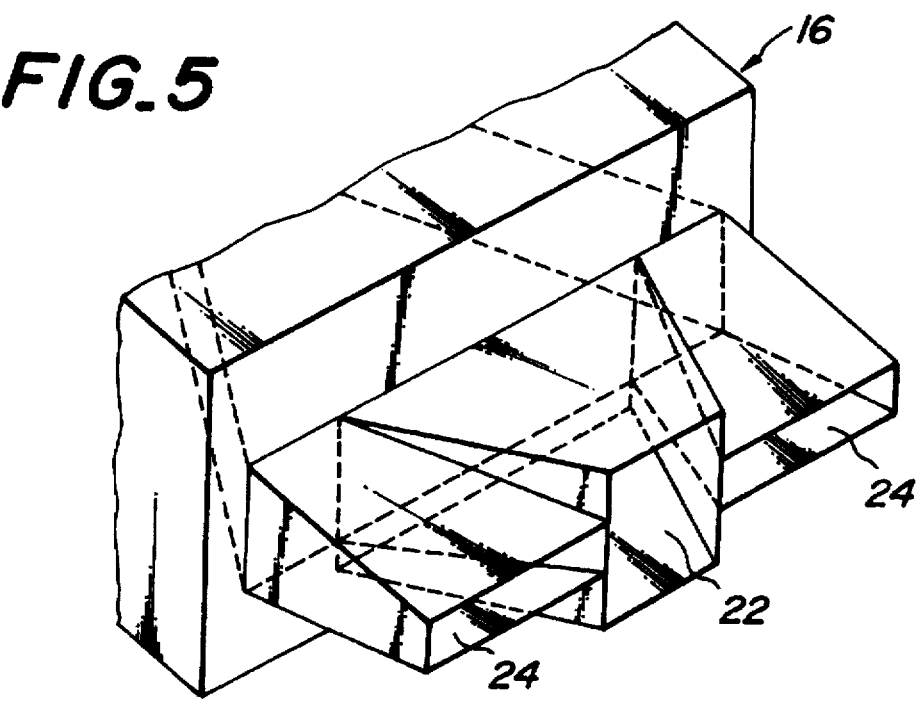
FIG. 5 is an enlargedly perspective view of rubber flowing passage in a part of an extrusion head and an auxiliary extrusion head of the extruder according to the invention, in which a thickness of a passage wall is omitted.

In the pneumatic tire according to the invention, the tread rubber is oriented so that the modulus ratio or ratio of 300% tensile modulus in circumferential direction to 300% tensile modulus in widthwise direction is made larger by at least 0.1 times in the central region of the tread than in the side region thereof. That is, the degree of orientation of rubber in the circumferential direction is high in the central region of the tread, so that the rigidity in the traction direction is enhanced to ensure the wear resistance and high-speed durability, while the degree of orientation of rubber in the circumferential direction is low in both side regions of the tread, so that the high gripping force in the cornering is obtained to provide excellent running performances. As a result, it is possible to use a relatively soft rubber for the entire tread rubber.

Thus, in the tire according to the invention, rubber having different degrees of orientation is integrally arranged in the central region and both side regions of the tread to separate the functions in the central region and both side regions of the tread, so that the wear resistance and high-speed durability and running performances are highly established.

Particularly, the modulus ratio is 1.1–1.5 in the central region of the tread and 0.9–1.2 in both side regions thereof. When the modulus ratio in the central region is less than 1.1, the effect of ensuring the wear resistance and high-speed durability is less. When it exceeds 1.5, cracks are apt to be created along the orientation direction. On the other hand, when the modulus ratio in the side region exceeds 1.2, the lateral rigidity of the tire is lacking. When it is less than 0.9, ride comfortability is degraded. Moreover, in case of a motorcycle tire, the modulus ratio in the side region is preferably not less than 1.0 in order to smoothly perform cornering.

In general, the rubber sheet for the tire tread is formed by extruding a given rubber composition through an extruder, so that the orientation of rubber ingredient or short fibers or the like filled in rubber is an important factor determining the performances of the tire product.

As the extruder used in the formation of such a rubber sheet, there is known an extruder 1 comprising a cylindrical barrel 2, a screw 3 arranged in the barrel, an extruder head 4 disposed between an outlet 2a of the barrel and an extruder die 5 as shown in FIG. 1. A long sideways passageway 4a formed in the head 4 has a width gradually changing from a position corresponding to the outlet 2a of the barrel 2 to a position corresponding to a closed end of the head 4 having a width larger than a maximum width of an extrudate to be extruded through an outlet 5a of the die 5. When a rubber sheet for a tire tread is formed by extruding a given rubber composition for the tire tread through such an extruder 1, the high polymer or short fiber included in the rubber composition is strongly oriented in the extrusion direction due to the rapid reduction of the passageway 4a by the outlet 5a of the die 5. As a result, when 300% tensile modulus is measured with respect to the rubber sheet vulcanized after the extrusion, the modulus value of the rubber sheet in the extrusion direction becomes larger than that in the widthwise direction of the rubber sheet. However, the modulus value in the extrusion direction is substantially equal over the widthwise direction of the rubber sheet.

In the invention, the tread rubber is oriented so that the modulus ratio or ratio of 300% tensile modulus in circumferential direction to 300% tensile modulus in widthwise direction is made larger by at least 0.1 times in the central region of the tread than in the side region thereof as previously mentioned. However, the tread rubber sheet satisfying the above relation of modulus ratio in the widthwise direction thereof can not be formed when using the conventionally known extruder as shown in FIG. 1. For this end, the inventors have made studies with respect to the structure of the extruder and found that the orientation of the rubber sheet can be controlled into a desired direction at different positions over the widthwise direction of the rubber sheet by simply changing the structure of the extrusion head to obtain a rubber sheet having desired properties at different positions in the widthwise direction of the sheet.

In the extruder used in the invention, an auxiliary extrusion head provided with orientation controlling flow-paths for differing an orientation of a rubber composition at different positions in a widthwise direction of a rubber sheet to be formed is interposed between an extrusion head and an extrusion die to control the orientation of the rubber composition passed through a passageway of the extrusion head at different positions in the widthwise direction of the sheet. It is favorable that these orientation controlling flow-paths in the auxiliary extrusion head are a combination of at least two of squeezing path, spreading path and straight path. When the passageway is divided into at least three flow-paths in the auxiliary extrusion head in the widthwise direction, it is preferable that one of these flow-paths forms a barrier portion of the extruding rubber composition together with the extrusion die by separating away at least one of both flow-path walls located in a thickness direction of the sheet from an opening portion or outlet of the extrusion die and each of the remaining flow-paths forms a non-barrier portion by locating both walls in the vicinity of the opening portion of the extrusion die. Moreover, the auxiliary extrusion head is preferable to be a removable system.

In the invention, the term "orientation" used herein means that high polymer or the like having a directional property in the rubber composition is distributed (or aligned) in a certain direction to give anisotropy of properties to the resulting rubber sheet. Moreover, the term "straight path" used herein means such a path that sizes of width and height in an inlet of the path are substantially equal to those in an outlet thereof.

For example, when the orientation controlling paths in the auxiliary extrusion head are a combination of the squeezing path and the spreading path in the widthwise direction of the rubber sheet to be formed, the high polymer or filler in the rubber composition passing through the squeezing path is oriented in the extrusion direction, while the high polymer or filler passing through the spreading path is oriented in a direction perpendicular to the extrusion direction. The squeezing path means that the size of width and/or height in the inlet is gradually larger than the size of width and/or height in the outlet in the longitudinal direction of the auxiliary extrusion head, while the spreading path means that the size of width and/or height in the inlet is gradually smaller than the size of width and/or height in the outlet in the longitudinal direction of the auxiliary extrusion head. Furthermore, when the barrier portion is formed in the flow-path, the flowing of the rubber composition is rapidly narrowed in the opening portion of the extrusion die and hence the high polymer or filler is strongly oriented in the extrusion direction. When the non-barrier portion is formed in the flow-path, the rubber composition is extruded through the die while maintaining the orientation state arrived to the opening portion of the die.

When the auxiliary extrusion head is removable type, several kinds of the auxiliary extrusion head having different shapes of orientation controlling flow-paths can be provided for properly and simply changing the orientation control.

An example of the extruder according to the invention will be described with reference to FIGS. 2-6 below.

An extruder 10 according to the invention comprises a cylindrical barrel 12, a screw 14 arranged in the barrel, an extrusion head 16 disposed between an outlet 12a of the barrel and an extrusion die 18 and has substantially the same structure as in the conventional extruder except that an auxiliary extrusion head 20 is disposed between an extrusion head 16 and an extrusion die 18. The extrusion head 16 is provided at its interior with such a passageway 16a that the sectional shape of the passageway gradually changes from a circle located at the outlet 12a of the barrel 12 to an oblong rectangle having a width wider than that of a rubber sheet 26 to be formed. The auxiliary extrusion head 20 disposed between the extrusion head 16 and the extrusion die 18 is provided with orientation controlling flow-paths 22, 24, 24 for changing the orientation through flowing of rubber, resin or the like to give an orientation distribution to the resulting rubber sheet.

In this case, a squeezing flow-path 22 is arranged in a central portion of the auxiliary extrusion head 20 in the widthwise direction thereof, while a pair of spreading flow-paths 24, 24 are arranged on both sides of the flow-path 22. As shown in FIG. 2, the flow-path 22 has a relationship of $W_1 > W_2$ in which $W_1$ is an inlet width and $W_2$ is an outlet width, while each of the flow-paths 24, 24 has a relationship of $W_3 < W_4$ in which $W_3$ is an inlet width and $W_4$ is an outlet width.

As shown in FIG. 3, an end of an upper wall of the squeezing flow-path 22 is located at a position above an upper wall face of an outlet 18a or an opening portion of the extrusion die 18. An end of a lower wall of the squeezing flow-path 22 is located at a position equal to or beneath a lower wall face of the opening portion 18a, whereby a barrier portion of the rubber composition to be extruded is formed in an outlet portion of the squeezing flow-path together with the extrusion die 18.

As shown in FIG. 4, ends of upper and lower walls of the spreading flow-path 24 are located at positions equal to upper and lower wall faces of the opening portion 18a of the extrusion die 18, whereby a non-barrier portion is formed in the outlet portion of the spreading flow-path 24.

When the rubber composition for the formation of the tire tread is extruded through the extruder 10 as shown in FIGS. 2-6, orientation of the rubber molecule or filler included in the rubber composition is controlled in the widthwise direction of the rubber sheet to be formed to have a desired orientation distribution.

In general, the orientation of the rubber molecule or filler is formed by stretching deformation of the high polymer material or the like during flowing. For example, when rubber suddenly flows from a wider passageway to a narrower passageway, the flow rate is rapidly accelerated toward the narrow passageway and hence rubber is largely stretched in the flowing direction to orient the rubber molecule or filler in the extrusion direction. Therefore, when rubber flows through the auxiliary extrusion head 20, the rubber passing through the squeezing flow-path 22 is stretched in the extrusion direction because the width of the flow-path is narrowed toward the opening portion 18a and hence the rubber molecule or filler is oriented in the extrusion direction. Furthermore, since the flow-path 22 is violently reduced at the extrusion die 18, the rubber molecule or filler is strongly oriented in the extrusion direction. On the other hand, rubber passing through the spreading flow-path 24 is stretched in a direction perpendicular to the flowing direction because the width of the flow-path 24 is widened toward the opening portion 18a and hence the rubber molecule or filler is oriented in the direction perpendicular to the extrusion direction and extruded through the opening portion 18a while maintaining the oriented state as far as possible because the reduction of the flow-path 24 is not caused in the vicinity of the extrusion die 18.

Figure 6:
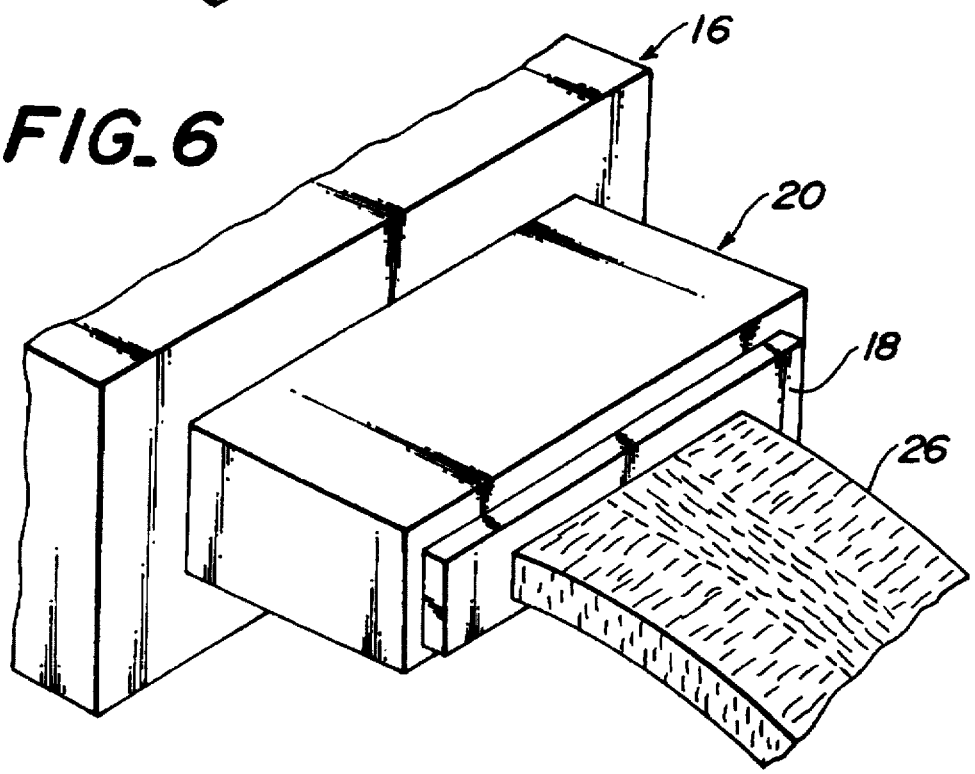
FIG. 6 is a perspective view of a main part of the extruder according to the invention.

As shown in FIG. 6, a rubber sheet 26 for the formation of the tire tread is extruded by passing the rubber composition through the extruder 10, in which the rubber molecule or filler is oriented in the extrusion direction at the widthwise central region of the rubber sheet and is randomly oriented at both widthwise side regions thereof. That is, the orientation is changed at positions in the widthwise direction of the rubber sheet to provide a given orientation distribution.

In the auxiliary extrusion head 20 of the illustrated embodiment, when the difference of $W_1 > W_2$ in the squeezing flow-path 22 is made large, the rubber molecule or filler is more oriented in the extrusion direction, while when the difference of $W_3 < W_4$ in the spreading flow-path 24 is made larger, the rubber molecule or filler is more oriented in the widthwise direction and the orientation becomes random.

For example, when the 300% tensile modulus of the rubber sheet in the extrusion direction is larger by 30% at the central region than at the side region in the widthwise direction, the dimensions (mm) of $W_1$ to $W_4$, L (length of flow-path in the auxiliary extrusion head) and $W_0$ (width of opening portion 18a of the extrusion die 18) in FIG. 2 are $W_1=100–160$, $W_2=60–80$, $W_3=60–80$, $W_4=90–120$, $L=30–50$ and $W_0=160–240$, respectively.

Test Example
(1) Conventional extruder (FIG. 1)

A rubber sheet of about 200 mm in width is extruded through the conventional extruder shown in FIG. 1. The dimensions (mm) of various portions in the extruder are $r_1$ (outlet of barrel)=150, $r_2$ (outlet of extrusion head)=40, $r_3$ (distance between $r_1$ and $r_2$)=50 and $r_4$ (outlet of extrusion die)=5, respectively.

(2) Extruder according to the invention (FIGS. 2–6)

The auxiliary extrusion head 20 according to the invention is interposed between the extrusion head and the extrusion die in the conventional extruder, in which the ends of upper and lower wall faces of the squeezing flow-path 22 are located at positions of 20 mm above the upper face and 10 mm beneath the lower face in the opening portion 18a as shown in FIG. 3 ($s_1$32 150 mm, $s_2$=50 mm, $s_3$=50 mm) and the ends of upper and lower wall faces of the spreading flow-path 24 are located at positions substantially equal to the upper and lower faces of the opening portion 18a as shown in FIG. 4 ($u_2$=40 mm, $u_3$=7 mm). The dimensions in FIG. 2 are $W_1$=160 mm, $W_2$=60 mm, $W_3$=30 mm, $W_4$=110 mm, L=50 mm, and $W_0$=200 mm, respectively. Moreover, the size of the opening portion 18a is the same as in the conventional extruder.

(Rubber composition to be extruded)

A rubber composition used comprises 100 parts by weight of rubber (SBR), 100 parts by weight of carbon black, 100 parts by weight of an oil and given amounts of vulcanizing agent, vulcanization accelerator, accelerator activator, antioxidant and plasticizer and is used under the same conditions.

A rubber sheet is formed by extruding the rubber composition through each of the above extruders and cured under the same conditions and then punched out in extrusion direction and widthwise direction to form DIN specimens, respectively. Thereafter, 300% tensile modulus of each of the specimens is measured according to a test method of JIS K6301. The measured results are shown in Table 1.

TABLE 1

|  | Central region of rubber sheet | | | Side region of rubber sheet | | |
| --- | --- | --- | --- | --- | --- | --- |
|  | 300% tensile modulus in extrusion direction (kgf/cm²) | 300% tensile modulus in widthwise direction (kgf/cm²) | Modulus ratio | 300% tensile modulus in extrusion direction (kgf/cm²) | 300% tensile modulus in widthwise direction (kgf/cm²) | Modulus ratio |
| Conventional extruder | 58.35 | 48.09 | 1.21 | 57.69 | 48.49 | 1.19 |
| Extruder according to the invention | 59.08 | 45.00 | 1.31 | 54.14 | 51.28 | 1.06 |

As seen from Table 1, the 300% tensile modulus in the extrusion direction is higher by about 20% than that in the widthwise direction irrespective of the widthwise positions in the conventional extrusion method. On the contrary, in the extrusion method according to the invention, the modulus in the extrusion direction is higher by about 30% than that in the widthwise direction at the central region. The modulus in the extrusion direction is higher only by 6% than that in the widthwise direction at the side region, so that the resulting rubber sheet has an orientation distribution in the widthwise direction.

Although the above embodiment uses the combination of squeezing flow-path and spreading flow-paths, there may be used various combinations of squeezing flow-path, spreading flow-path and straight flow-path as much as the given orientation distribution can be obtained in the widthwise direction of the rubber sheet. Furthermore, there may be used a combination of the squeezing flow-path satisfying a relationship of inlet height>outlet height and the spreading flow-path satisfying a relationship of inlet height<outlet height.

As an orientable material in the rubber composition, high polymers such as thermoplastic resins and thermosetting resins may be used in addition to the above rubber reinforced with carbon black. As a filler, inorganic and organic fillers such as calcium carbonate, basic magnesium carbonate hydrate, clay, silicates, natural silicic acid, alumina hydrate, barium sulfate, calcium sulfate, metal powder, wood powder, fruit shell powder, cellulose and the like may be used. Furthermore, short fibers may be used as a filler and include cut pieces of organic fibers such as aromatic polyamide, vinylon, polyester, nylon, rayon and the like, needle crystal of cis-1,2-polybutadiene or the like, whisker of polyoxymethylene or the like, cut pieces of inorganic fibers such as glass, carbon, graphite, metal and the like, silicon carbide whisker, tungsten carbide whisker, alumina whisker and so on.

These fillers may be used alone or in admixture. Among them, all materials having an aspect ratio of less than 1 or more than 1 are oriented in any direction.

The following examples are given in illustration of the invention and are not intended as limitations thereof.

EXAMPLES 1-4, COMPARATIVE EXAMPLE 1

There are provided five pneumatic radial tires for motorcycles having a tire size of 150/60R17. In the tires of Examples 1-4 and Comparative Example 1, the tread is equally divided into eight parts in the widthwise direction, in which central four parts are called as a tread central region and the remaining four side parts are called as both tread side regions.

In the tire of Example 1, the tread rubber is oriented in such a manner that when a ratio of 300% tensile modulus in the circumferential direction of the tire to 300% tensile modulus in the widthwise direction of the tire is a modulus ratio, the modulus ratio in the tread central region is 1.20 and the modulus ratio an the tread side region is 1.10.

In the tire of Example 2, the tread rubber as oriented in such a manner that the modulus ratio in the tread central region is 1.30 and the modulus ratio an the tread side region is 1.10.

In the tire of Example 3, the tread rubber is oriented in such a manner that the modulus ratio in the tread central region is 1.40 and the modulus ratio an the tread side region is 1.20.

In the tire of Example 4, the tread rubber is oriented in such a manner that the modulus ratio in the tread central region is 1.45 and the modulus ratio in the tread side region is 1.15.

In the tire of Comparative Example 1, the tread rubber is oriented in such a manner that the modulus ratio in both the tread central region and the tread side region is 1.00. This tire is the conventionally known tire.

The running performance and wear resistance are evaluated by the following methods under the same conditions with respect to these tires. The evaluated results are shown in Table 2.

The running performance is evaluated by a feeling test of a driver on gripping force during the cornering when the test tire is mounted onto a rear wheel of a motorcycle and run on a test course and represented by an index value on the basis that Comparative Example 1 is 100. The larger the index value, the better the running performance.

The wear resistance is evaluated by measuring an average remaining groove depth of the test tire after the test tire is run on the test course over a distance of 200 km after the evaluation of running performance and represented by an index value on the basis that Comparative Example 1 is 100. The larger the index value, the better the wear resistance.

TABLE 2

|  | Modulus ratio | | Running performance (index) | Wear resistance (index) |
| --- | --- | --- | --- | --- |
|  | Tread side region | Tread central region | | |
| Example 1 | 1.10 | 1.20 | 119 | 108 |
| Example 2 | 1.10 | 1.30 | 121 | 111 |
| Example 3 | 1.20 | 1.40 | 116 | 113 |
| Example 4 | 1.15 | 1.45 | 120 | 115 |
| Comparative Example 1 | 1.00 | 1.00 | 100 | 100 |

As seen from Table 2, the tires of Examples 1-4 are excellent in the running performance and wear resistance as compared with the tire of Comparative Example 1.

EXAMPLE 5

There is provided a pneumatic radial tire for passenger car having a tire size of 205/65R15 and having a tread comprised of a cap rubber layer and a base rubber layer, in which the modulus ratio of the base rubber layer is 1.09 in the tread central region corresponding to 0.6 times of a tread width and 0.91 in the tread side region. In this tire, the shearing rigidity in the circumferential direction is increased in the tread central region considerably contributing to the braking performance, while the bending rigidity is lowered in the tread side region considerably contributing to the ride comfortability, so that the tire simultaneously satisfies both the braking performance and the ride comfortability.

What is claimed is:

1. In a pneumatic tire comprising; a tread made from an oriented rubber sheet having a modulus ratio of 300% tensile modulus in a circumferential direction of the tire to a 300% tensile modulus in a widthwise direction of the tire in a central region of the tread which is larger by at least +0.1 times than corresponding modulus ratios in each side region of the tread, and the modulus ratio is 1.1-1.5 in the central region of the tread and 0.9-1.2 in the side region of the tread, and the rubber sheet is made by a process of extruding rubber by an extruder having an extrusion head including orientation controlling flow-paths consisting of a squeezing path to orient the rubber in said central region of said rubber sheet in the circumferential direction of the tire and spreading paths located on both sides of the squeezing path to orient the rubber in each side region in the widthwise direction of the tire.

2. A pneumatic tire according to claim 1, wherein the central region of the tread is located at a zone centering around a tread center and corresponding to 0.3-0.7 times a width of the tread.

3. A pneumatic tire according to claim 2 wherein said tire is a motorcycle tire and said central region of said tread is 0.5 of an overall treadwidth.

4. A pneumatic tire according to claim 2 wherein said rubber sheet comprises a composition of a rubber, carbon black, oil, a vulcanizing agent, vulcanizing accelerator, accelerator activator, antioxidant and plasticizer.

5. A pneumatic tire according to claim 4 wherein said rubber is styrene butadiene rubber.

6. A pneumatic tire according to claim 2 wherein said rubber is a high polymer selected from the group consisting of thermoplastic resins and thermosetting resins and said composition further comprises a filler.

7. A pneumatic tire according to claim 1 wherein said tire is a passenger car tire and said central region of said tread is 0.6 of an overall treadwidth.

* * * * *